United States Patent [19]
Betts et al.

[11] Patent Number: 5,447,031
[45] Date of Patent: Sep. 5, 1995

[54] WASTEGATE FAILURE DETECTION APPARATUS AND METHOD FOR OPERATING SAME

[75] Inventors: Edward H. Betts, Chillicothe; Shawn J. Weck, Edwards, both of Ill.

[73] Assignee: Caterpillar Inc., Peoria, Ill.

[21] Appl. No.: 230,278

[22] Filed: Apr. 20, 1994

[51] Int. Cl.⁶ .................... F02B 77/08; F02D 23/02
[52] U.S. Cl. ................................ 60/603; 123/198 D
[58] Field of Search ............. 60/600, 603; 123/198 D

[56] References Cited

U.S. PATENT DOCUMENTS

| | | | |
|---|---|---|---|
| 4,169,355 | 10/1979 | Walsham et al. | 60/682 |
| 4,174,617 | 11/1979 | Jalali-Karchay | 60/602 |
| 4,434,761 | 3/1984 | Ludwig | 123/198 D |
| 4,492,203 | 1/1985 | Yutaka | 60/601 |
| 4,496,286 | 1/1985 | Gagnon | 60/603 |
| 4,531,493 | 7/1985 | Fortnagel | 123/198 D |
| 4,633,670 | 1/1987 | Iwasa | 60/603 |
| 4,656,834 | 4/1987 | Elpern | 60/602 |
| 4,685,435 | 8/1987 | Denz et al. | 60/603 |
| 4,703,625 | 11/1987 | Caldwell | 60/602 |
| 4,748,567 | 5/1988 | Sumizawa et al. | 364/431.11 |
| 4,790,139 | 12/1988 | Roach | 60/602 |
| 5,121,604 | 6/1992 | Berger et al. | 60/602 |
| 5,155,998 | 10/1992 | Monden | 60/602 |
| 5,159,815 | 11/1992 | Schlamadinger | 60/603 |

*Primary Examiner*—Michael Koczo
*Attorney, Agent, or Firm*—R. Carl Wilbur

[57] ABSTRACT

A dynamic wastegate failure detection apparatus for determining wastegate failure levels for individual internal combustion engines is disclosed. The apparatus repeatedly measures and stores intake boost pressures at times when the engine is producing higher boost pressure levels. The apparatus calculates a boost pressure limit value as a function of the stored boost pressures. A wastegate failure is indicated and the engine output power is derated when a boost pressure value exceeds the sum of the boost pressure limit value and a predetermined pressure differential.

17 Claims, 3 Drawing Sheets

WASTEGATE FAILURE DETECTION APPARATUS AND METHOD FOR OPERATING SAME

TECHNICAL FIELD OF THE INVENTION

The present invention relates generally to the field of electronically controlled turbocharged engines, and more particularly to an electronic control for implementing a wastegate failure detection and engine derate strategy.

BACKGROUND OF THE INVENTION

Turbocharged engines are well known in the art. A turbocharger may include a turbine wheel that is inserted in the exhaust path of the engine. Mechanically connected to the turbine is a compressor wheel that is located in the inlet manifold of the engine. As is known in the art, the engine exhaust causes the turbine wheel to rotate thereby causing the compressor wheel to compress the air entering the engine intake manifold. By compressing the air, a greater quantity of air can be introduced in the engine cylinders, thereby permitting a greater quantity of fuel to be injected, and in this manner, increasing the power output of the engine over a normally operated engine.

In some instances, compressing the air may cause too great a pressure increase in the intake manifold or too much pressure in the engine cylinder. In those cases, if the turbocharger is allowed to operate unrestrained, the engine might be damaged. A wastegate is often installed to prevent the pressure from exceeding a level at which engine damage might occur.

A wastegate is typically connected to both the intake and exhaust manifolds. When the pressure in the intake manifold approaches a level that might damage the engine, the wastegate opens a port in the engine's exhaust plumbing, which causes the exhaust gas to bypass the turbocharger turbine wheel. This, in turn, reduces the speed of the turbine, thereby reducing the compressing force exerted by the turbocharger compressor. In this manner, the wastegate helps to insure that the turbocharger does not create a damaging intake manifold pressure.

However, if the wastegate valve malfunctions, the bypass path around the turbocharger turbine wheel closes preventing exhaust gas from bypassing the turbine wheel. Thus, if the wastegate malfunctions, the turbocharger compressor can continue to compress air beyond the pressure level that might cause damage to the engine.

Other wastegate control systems are known in the prior art. For example, U.S. Pat. No. 5,121,604 discloses a closed loop control for a wastegate that attempts to regulate the intake manifold pressure according to a predetermined map that is a function of engine speed and other parameters. The disclosure discusses safeguards to protect against electrical failures. For example, a switch is provided that becomes active when the servo loop fails. By activating the switch, the control delivers a fixed command valve that is only a function of engine speed. In this manner, the intake manifold pressure is held below a level that might cause engine damage. However, the U.S. Pat. No. 5,121,604 patent does not disclose any safeguard to protect the engine in the event the wastegate valve itself fails.

Another example of a known wastegate control is disclosed in U.S. Pat. No. 4,646,834. This patent discloses a control that biases the wastegate valve to a predetermined position in the event of an electrical failure. That predetermined position will result in reduced pressure levels over the levels that would otherwise be permitted if the system were operating correctly. As with the U.S. Pat. No. 5,121,604 patent discussed above, this disclosure does not discuss a control system that protects against wastegate failure.

Also, neither these devices nor any other known control systems measure each engine's specific permissible boost pressure levels which can then be compared against current boost pressures to determine whether a wastegate valve has failed. Furthermore, in the prior art, control systems do not derate engine power output in the event of a wastegate failure.

The present invention overcomes the disadvantages of previous wastegate valves and wastegate controls. These and other advantages of the present invention will be understood from reading the specification in connection with the drawings and claims.

SUMMARY OF THE INVENTION

In one aspect of the invention, a method for controlling an engine equipped with a turbocharger having a wastegate control valve is disclosed. The engine and wastegate control valve are controlled by an electronic controller which produces a fuel delivery command as a function of a horsepower map stored in memory. The method includes the steps of sensing a first boost pressure in an intake manifold of the engine and responsively producing a first boost pressure signal; comparing the first boost pressure signal to a predetermined value; and reducing the fuel delivery command as a function of the step of comparing.

In another aspect of the invention, an apparatus for detecting a wastegate failure and thereafter regulating boost pressure in an intake manifold of an engine equipped with a turbocharger having a wastegate is disclosed. The apparatus includes an electronic controller; a pressure sensor connected to the electronic controller and producing a boost pressure signal responsive to the pressure in the intake manifold; wherein said electronic controller produces a first fuel delivery command as a function of a first fuel delivery curve and produces a second fuel delivery command as a function of a second fuel delivery curve in response to said boost pressure signal being greater than a predetermined boost pressure limit.

These and other aspects of the invention will be apparent upon reading the detailed description in connection with the drawings and claims.

DETAILED DESCRIPTION OF THE BEST MODE

Figure 1:
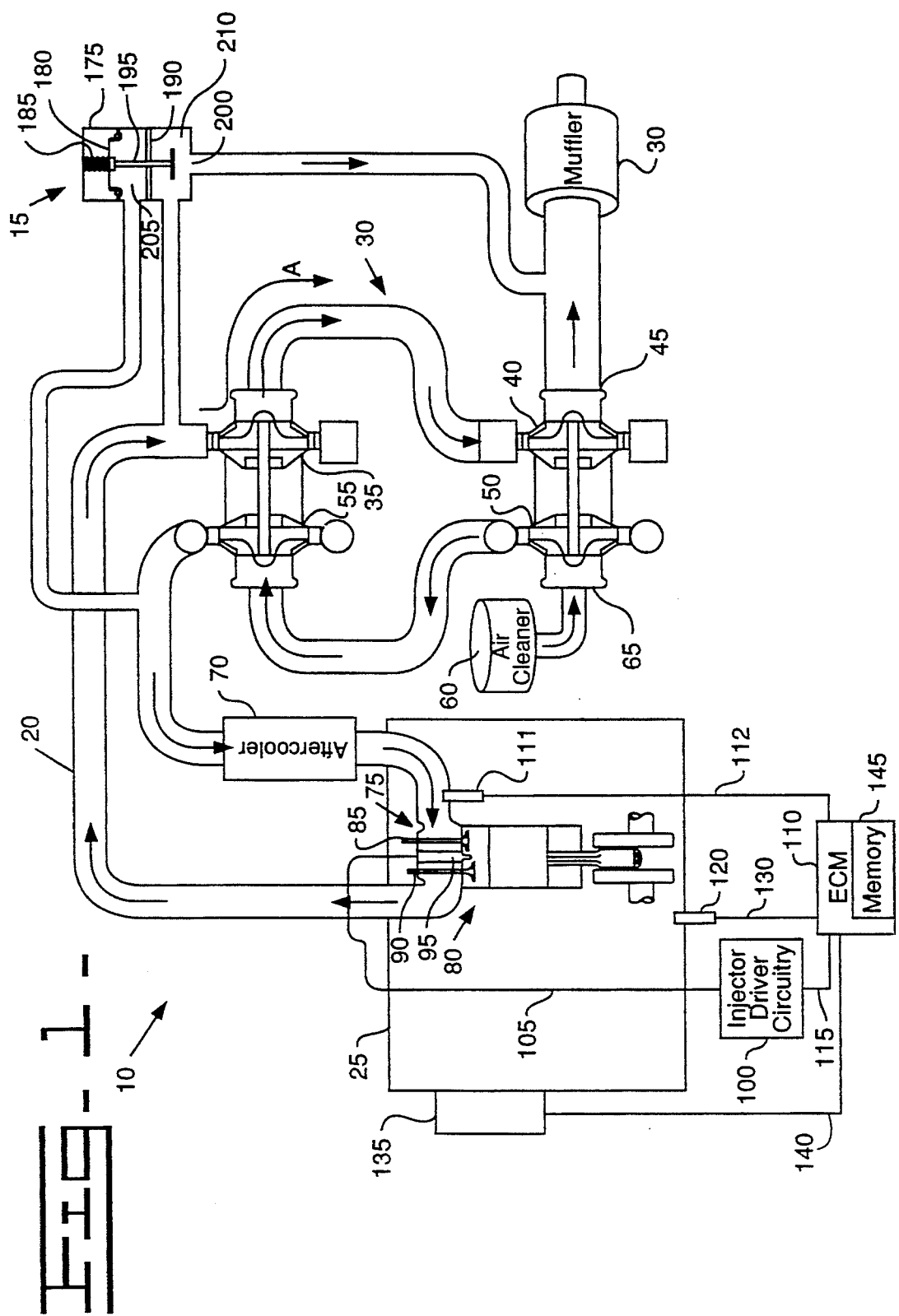
FIG. 1 shows in block diagram form an embodiment of the wastegate control of the present invention.

Referring first to FIG. 1, a block diagram of a preferred embodiment of the wastegate control 10 of the present invention is shown. A wastegate control valve 15 is connected between an exhaust manifold 20 of an internal combustion engine 25 and the inlet to an exhaust muffler 30. The wastegate control valve 15 is also connected to an inlet of an aftercooler 70 in the intake path of the engine 25. As is shown, the wastegate valve forms an exhaust path that is parallel to an exhaust path (A) running through a turbocharger 30. More specifically, the exhaust path (A) through the turbocharger generally includes a high pressure turbine wheel 35 and a low pressure turbine wheel 40. Exhaust gas then flows out of the turbocharger 30 through a low pressure exhaust outlet 45 to the muffler 30.

The high pressure and low pressure turbine wheels 35, 40 are mechanically connected to a high pressure and a low pressure compressor wheel 50, 55, respectively. Air flows through an air cleaner 60 into a low pressure turbocharger air inlet 65. The low pressure compressor wheel 50 causes the air to be compressed, thereby increasing the pressure of the air as it flows to the high pressure compressor wheel 55. As is known, the amount that the air is compressed by the low pressure compressor wheel 50, and thus, the amount of the increase in air pressure resulting from the low pressure compressor wheel 50, is a function of the rotational speed of the low pressure turbine wheel 40.

The compressed air leaving the low pressure compressor wheel 50 is then compressed by the high pressure compressor wheel 55. Although the preferred embodiment includes a turbocharger with two turbine wheels and two compressor wheels, turbochargers having a single turbine and wheel are known in the art. The present wastegate control as defined by the appended claims extends to applications involving such a turbocharger.

An aftercooler 70 is connected to the output of the high pressure compressor wheel 55 and is connected to an intake manifold 75 of the engine 25. A single cylinder 80 of the engine 25 is shown in FIG. 1. However, the engine 25 may include any number of cylinders 80. The cylinder includes at least one intake valve 85 and at least one exhaust valve 90. A fuel injector 95 injects fuel into the cylinder 80 in response to receiving an injector driver command signal from the injector driver circuitry 100 over connector 105. The driver circuitry 100 produces the injector driver command as a function of a fuel command signal delivered by the electronic control module (ECM) 110 over connector 115. After the air fuel mixture has been detonated, exhaust gas leaves the engine cylinder 80 through the exhaust valve 90 and enters an exhaust manifold 20.

The ECM 110 is connected to a coolant temperature sensor 120 by a connector 130. The coolant temperature sensor 120 is preferably installed in a coolant flow passage in the engine 25 and produces a coolant temperature signal on the connector 130. An engine speed sensor 135 is connected to the camshaft of the engine 25 and produces an engine speed signal on connector 140 which is connected to the ECM 110. In a preferred embodiment, memory 145 is included within the ECM 110.

A boost pressure sensor 111 is associated with the intake manifold 75 and produces a boost pressure signal that is a function of the air pressure within the intake manifold 75. The boost pressure sensor 111 is connected to the ECM 110 by a connector 112. The ECM 110 reads the boost pressure signal over connector 112.

As is shown in FIG. 1, the wastegate valve 15 is preferably connected between the exhaust manifold 20 and the outlet of the high pressure turbocharger compressor wheel 55. In a conventional manner, the wastegate includes a housing 175 and a diaphragm 180 connected to the housing 175 near a perimeter of the diaphragm 180. A valve 195 and a spring 185 are connected to the diaphragm 180. The spring 185 biases the valve 195 to a closed position, in which the valve closes an exhaust bypass opening 200 to prevent exhaust gas from bypassing the high pressure turbine wheel 35 and the low pressure turbine wheel 40. A divider 190 is attached within the housing 175 to create separate cavities within the housing 175. For example, the housing 175 includes an inlet boost pressure cavity 205 and an exhaust gas cavity 210. The inlet boost pressure cavity 205 communicates with the outlet of the high pressure compressor wheel 55. The pressure of the air exiting the high pressure compressor wheel 55 causes the diaphragm 180 to move the valve 195 against the downwardly biasing force of the spring. For example, if the air pressure is sufficient to cause the diaphragm 195 to compress the spring 185 then the valve 195 will move to an open position, thereby allowing the flow of exhaust gas through the exhaust cavity 210 and through the exhaust bypass opening 200 to the muffler 30. In this manner, when the boost pressure exceeds a predetermined value determined by the biasing force of the spring, the wastegate valve will open thereby diverting exhaust gas from the high pressure turbine wheel 35 and the low pressure turbine wheel 45. This in turn reduces the force exerted by the compressor wheels 50, 55 and reduces the boost pressure in the intake manifold 75. The wastegate thereby helps prevent damage to the engine that might otherwise be caused if the turbocharger were permitted to create excess inlet air pressures.

Figure 2:
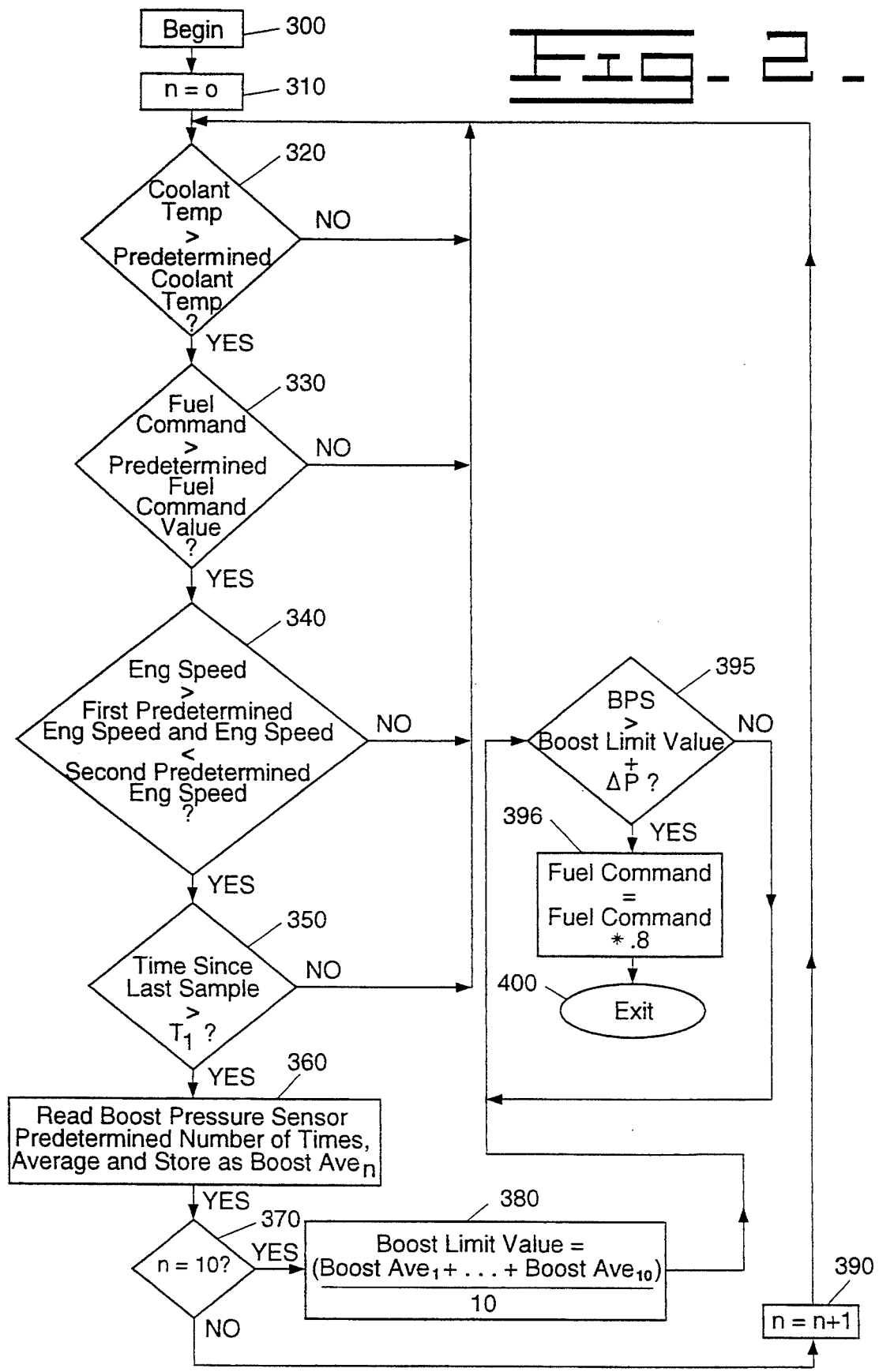
FIG. 2 shows a flowchart of the software control for an embodiment of the wastegate control of the present invention.

Referring now to FIG. 2, a block diagram of the software control used in a preferred embodiment of the present invention is shown. Software can be readily and easily coded from FIG. 2, using any suitable microprocessor and assembly language associated with the microprocessor. Coding such software from the flowchart shown in FIG. 2 is a mechanical step for those skilled in the art.

It is assumed that when an engine is started for the first time after the manufacture of the engine the wastegate valve 15 will operate correctly. Upon starting the engine, the wastegate control of the present invention will begin to measure a specific boost pressure fault value for the specific engine. Such boost pressure fault values may vary from engine to engine because of small differences in tolerances, etc. between engines. The present invention allows the ECM to select a customized boost pressure fault value for each engine.

In block 300, software control for a preferred embodiment of the present invention is initiated. In block 310, a counter is reset to zero and software control passes to block 320.

In block 320, the ECM 110 reads a coolant temperature signal on conduit 130, which is produced by the coolant temperature sensor 120. The ECM 110 compares that value to a predetermined coolant temperature value. In a preferred embodiment, the predetermined coolant temperature value is about 85 degrees centigrade, although other values may be readily and easily used. If the coolant temperature signal exceeds the predetermined coolant temperature value, then software control passes to block 330. Otherwise software control returns to block 320.

In block 330, the ECM 110 estimates current engine load as a function of the fuel command signal on connector 115. The ECM 110 does this by comparing the fuel command signal 115 to a predetermined fuel command value. In a preferred embodiment, the predetermined fuel command value corresponds to a value that is about 95 percent of a full fuel command. If the fuel command exceeds the predetermined fuel command value then software control passes to block 340. Otherwise, software control returns to block 320.

In block 340, the ECM 110 reads an engine speed signal produced by the engine speed sensor 135 on conduit 140. The ECM compares the engine speed signal to a first and second predetermined engine speed. In a preferred embodiment, the first and second predetermined engine speeds correspond to speeds of approximately 1600 RPM and 1700 RPM respectively. When the engine speed signal corresponds to an engine speed that is between the first and second predetermined engine speed values, software control passes to block 350. Otherwise, control passes to block 320.

In block 350, the ECM calculates the elapsed time since the last boost pressure sample was taken and compares that elapsed time to a predetermined time period T1. In a preferred embodiment, the predetermined time period is about 30 minutes. However, other values may be readily and easily substituted without deviating from the spirit and scope of the invention as defined by the appended claims. If the elapsed time exceeds the predetermined time period, then software control passes to block 360. Otherwise control passes to block 320.

In block 360, the ECM 110 reads a boost pressure signal a predetermined number of times and averages those readings. The boost pressure signal is produced by the boost pressure sensor 111 over conduit 112. In a preferred embodiment the predetermined number of times is five. However, the predetermined number of readings could be readily and easily changed without deviating from the scope and spirit of the invention as defined by the appended claims. The ECM 110 averages those predetermined number of boost pressure values and stores the average in memory 145. Software control then passes from block 360 to block 370.

In block 370, the ECM 110 determines whether ten boost pressure averages (BOOSTAV) have been taken and stored in memory. If ten boost pressure averages have been taken, then software control passes to block 380. Otherwise, software control passes to block 390. In block 390, the counter (n) is incremented and control passes to block 320.

In block 380, the boost pressure limit value is set to the average of the ten boost pressure averages (BOOSTAV). Control then passes to block 395. In block 395, the ECM reads the current boost pressure value BPS produced by the boost pressure sensor 111 on conduit 112. The current boost pressure value is then compared to the sum of the boost limit value and a predetermined pressure differential $\Delta P$. If the current boost pressure BPS is greater than the sum, an overboost situation is indicated. Control then passes to block 396 in which the fuel commands issued by the ECM is derated to 80% of normal values. If, on the other hand, the current boost pressure BPS is less than the sum of the boost limit value and the predetermined pressure differential $\Delta P$, then control returns to block 395 where another current boost pressure value BPS is read. As can be seen from the flowchart, as long as the current boost pressure value is less than the sum of the boost limit value and the predetermined pressure differential $\Delta P$, the ECM 110 will repeatedly read current boost pressure values and make the comparison shown in block 395.

Although in preferred embodiment, the ECM derates engine power output by twenty percent, that amount can be readily and easily adjusted to other values without deviating from the spirit and scope of the invention as defined by the appended claims.

The conditions outlined in blocks 320 through 350 exemplify engine operating conditions when the engine will produce higher boost pressure values. It is advantageous to calculate a boost pressure limit value when the engine is producing higher boost pressure levels within a permissible operating range. In that manner, the boost pressure limit value will correspond to a boost pressure at the top of the permissible boost pressure value operating range. The wastegate failure control will then be less likely to indicate a wastegate failure, and derate the engine, when the engine is in fact operating at a permissible boost pressure. After calculating the boost pressure limit value, the ECM 110 then determines that the wastegate valve has failed by measuring the actual boost pressure value on connector 112, comparing that value to the boost pressure limit value and determining whether the actual value exceeds the limit value.

Several specific values have been suggested for the engine operating parameters outlined in blocks 320 through 350. However, those parameters may be varied depending on the specific engine or the specific application without deviating from the scope of the present invention as defined by the appended claims. As noted above, those parameter values should be selected so that the engine is operating at higher boost pressure levels within a permissible operating range.

In some instances, it may be preferable to calculate a boost pressure limit value that reflects specific operating conditions that may change over time. For instance, boost pressure within the engine may vary with altitude or extreme temperature changes. In these instances it would be preferable to have a system that would modify the boost pressure limit value to accommodate these changes.

Figure 3:
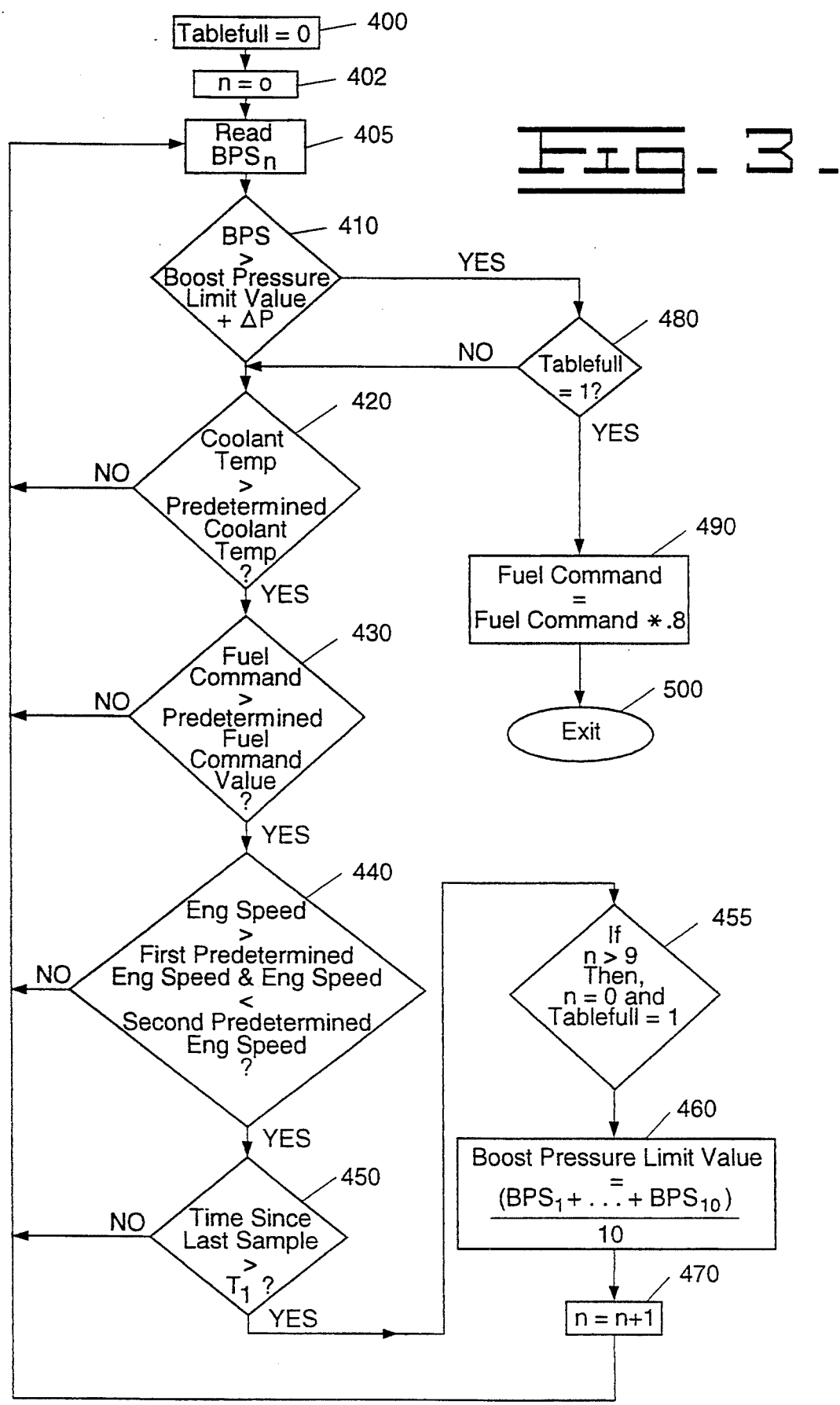
FIG. 3 shows a flowchart of the software control for an embodiment of the present invention.

FIG. 3 illustrates a flowchart of software control for use with an embodiment of the present invention that calculates a boost pressure limit value as a running average of boost pressure readings. The software code can be readily and easily written from the flowchart by anyone skilled in the art.

In block 400, software control begins by setting the software flag TABLEFULL equal to zero. Program control then passes from block 400 to block 402. In block 402, the ECM 110 sets a counter (n) to zero. Software control then passes to block 405.

In block 405, the ECM 110 reads the boost pressure signal (BPS) output by the boost pressure sensor 111 on the connector 112. The ECM 110 stores the value as a variable $BPS_n$, where n is the current counter value. Software control then passes to block 410.

In block 410, the ECM 110 compares the current boost pressure signal $BPS_n$ to a boost pressure limit value. As is explained more fully below, the ECM 110 calculates the boost pressure limit value as a function of a running average of recent boost pressure signals. If the current boost pressure value $BPS_n$ is more than the boost pressure limit value plus a predetermined pressure differential $\Delta P$, then control passes to block 480. In block 480, the ECM reads a software flag TABLEFULL to determine whether a sufficient number of boost pressure signals $BPS_n$ have been read for the ECM to calculate a boost pressure limit value. In FIG. 3, as is described more fully below, the TABLEFULL flag is set to one when the ECM 110 has read at least ten boost pressure signals BPS. However, the TABLEFULL flag could be readily and easily set to one at other values without deviating from the spirit and scope of the invention as defined by the appended claims. If the TABLEFULL flag is not equal to one, then the number of boost pressure samples taken is considered to be insufficient to have produced an accurate boost pressure limit value, and software control proceeds to block 420. Otherwise if the current boost pressure value exceeds the sum of the calculated boost pressure limit value and the predetermined pressure differential $\Delta P$, and the TABLEFUL flag is equal to one, then software control proceeds to block 490. In block 490, all fuel commands issued by the ECM 110 to the injector driver circuitry 100 are multiplied by 80%. Thus, the driver circuitry 100 will produce injector signals that are reduced by 20%. In this manner, the engine output power is derated by twenty percent. Program control passes from block 490 to block 500 and back to the main program.

If the current boost pressure signal $BPS_n$ is less than the boost pressure limit value plus $\Delta P$, then program control passes from block 410 to block 420. In blocks 420 through 450, the ECM 110 determines whether the engine is operating within certain operating parameters indicative of high boost pressures within a permissible operating range. These decisional blocks help insure that the engine is running at high boost pressure levels when the ECM 110 calculates an updated boost pressure limit value in block 460.

In block 420, the ECM 110 reads a signal on conduit 130, which is produced by the coolant temperature sensor 120. The ECM 110 compares that value to a predetermined coolant temperature value. In a preferred embodiment, the predetermined coolant temperature value is about 85 degrees centigrade. If the coolant temperature signal exceeds the predetermined coolant temperature value, then software control passes to block 430. Otherwise software control returns to block 405.

In block 430, the ECM 110 estimates the current engine load as a function of the fuel command signal on conduit 115. The ECM compares the fuel command signal to a predetermined fuel command value. In a preferred embodiment, the predetermined fuel command value corresponds to a value that is about 95 percent of a full fuel command. If the fuel command exceeds the predetermined fuel command value, software control passes to block 440. Otherwise, software control returns to block 405.

In block 440, the ECM 110 reads an engine speed signal produced by the engine speed sensor 135 on conduit 140. The ECM compares the engine speed signal to a first and second predetermined engine speed. In a preferred embodiment, the first and second predetermined engine speeds correspond to speeds of approximately 1600 RPM and 1700 RPM respectively. When the engine speed signal corresponds to an engine speed that is between the first and second predetermined engine speed values, then software control passes to block 450. Otherwise, control passes to block 405.

In block 450, the ECM 110 calculates the elapsed time since the last boost pressure sample was taken and compares that elapsed time to a predetermined time period T1. In a preferred embodiment, the predetermined time period is about 30 minutes. However, other values may be readily and easily substituted without deviating from the spirit and scope of the invention as defined by the appended claims. If the elapsed time exceeds the predetermined time period, then software control passes to block 455. Otherwise control passes to block 405.

In block 455, if the counter (n) exceeds nine, then the counter is reset to zero and the TABLEFULL flag is set to one. The TABLEFULL flag thereby signifies that enough boost pressure values have been averaged to produce a valid boost pressure limit value.

In block 460, the ECM 110 calculates an updated boost pressure limit value. The ECM 110 sums the ten most recent boost pressure values that were recorded when the engine operating conditions fell within the conditions of blocks 420 through 450. The boost pressure limit value is then calculated as an average of that sum. From block 460, program control passes to block 470 where the ECM 110 increments the counter (n). From block 470, program control returns to block 405.

This embodiment permits the ECM to keep a running average of boost pressure signals to calculate a boost pressure limit value. In this manner, the wastegate failure detector of this embodiment can adjust the boost pressure limit value to account for gradual changes in temperature, altitude, atmospheric, or other conditions.

Industrial Applicability

The present invention may be used to determine when a wastegate valve has failed. When a wastegate valve fails it often will close the bypass path that allows exhaust gas to exit the engine without further spinning a turbocharger turbine wheel. The exhaust gas can then cause further compression of intake air thereby creating the potential that the boost pressure will be excessive and damage the engine.

The present invention compares the current boost pressure to a boost pressure limit. A wastegate failure is indicated when the boost pressure exceeds the boost pressure limit value. In response, the electronic control module causes the engine output to be derated, thereby decreasing the boost pressure created by the engine.

We claim:

1. A method for controlling an engine equipped with a turbocharger having a wastegate control valve, the engine being controlled by an electronic controller, the electronic controller producing a fuel delivery command as a function of a horsepower map stored in memory, the method comprising the steps of:

sensing a first boost pressure in an intake manifold of the engine and responsively producing a first boost pressure signal;

comparing the first boost pressure signal to a predetermined value;

reducing the fuel delivery command as a function of the first boost pressure signal exceeding the predetermined value sensing a second boost pressure in the intake manifold and responsively producing a second boost pressure signal;

averaging the first boost pressure signal and the second boost pressure signal;

producing an average boost pressure signal as a function of said step of averaging;

comparing the average boost pressure signal to the predetermined value; and derating the horsepower map by a predetermined percentage as a function of the average boost pressure signal exceeding the predetermined value, thereby causing a corresponding decrease in the fuel delivery command.

2. A method for controlling an engine equipped with a turbocharger having a wastegate control valve, the engine being controlled by an electronic controller, wherein the electronic controller produces a fuel delivery command as a function of a horsepower map stored in memory, the method comprising the steps of:

repeatedly sensing a boost pressure in an intake manifold of the engine and responsively producing a boost pressure signal;

averaging said boost pressure signals to produce an average boost pressure signal;

producing a boost pressure limit value, wherein said boost pressure limit signal is the sum of said average boost pressure signal and a predetermined pressure value;

sensing another boost pressure signal;

comparing said other boost pressure signal to said boost pressure limit value; and reducing said fuel delivery command in response to said other boost pressure signal exceeding said boost pressure limit value.

3. A method according to claim 2, wherein said step of repeatedly sensing a boost pressure includes the steps of:

sensing an engine coolant temperature sensor and responsively producing an engine coolant temperature signal;

sensing an engine speed sensor and responsively producing an engine speed signal;

sensing said boost pressure in response to said engine coolant temperature exceeding a predetermined coolant temperature value, a fuel command exceeding a predetermined fuel command value, and said engine speed signal being between a first predetermined engine speed value and a second predetermined engine speed value.

4. The method according to claim 3, wherein said predetermined coolant temperature is about 85 degrees centigrade.

5. The method according to claim 3, wherein said predetermined fuel command value is about 95 percent of a full fuel command.

6. The method according to claim 3, wherein said first predetermined engine speed is about 1600 revolutions per minute.

7. The method according to claim 6, wherein said second predetermined engine speed is about 1700 revolutions per minute.

8. The method according to claim 3, wherein said step of repeatedly sensing includes sensing at least five boost pressures.

9. An apparatus for detecting a wastegate failure and thereafter regulating boost pressure in an intake manifold of an engine equipped with a turbocharger having a wastegate, said apparatus comprising:.

an electronic controller;

fuel delivery means connected to said electronic controller;

a pressure sensor connected to said electronic controller and associated with the intake manifold of said engine, wherein said pressure sensor produces a boost pressure signal responsive to the pressure in said intake manifold;

wherein said electronic controller produces a first fuel delivery command as a function of a first fuel delivery curve and produces a second fuel delivery command as a function of a second fuel delivery curve in response to said boost pressure signal being greater than a predetermined boost pressure limit; and wherein said electronic controller inputs said boost pressure signal at predetermined time intervals, and wherein said electronic controller produces said predetermined boost pressure limit as an average of a predetermined number of said boost pressure signals.

10. The apparatus according to claim 9, wherein said boost pressure limit is a running average of a predetermined number of the most recent boost pressure signals.

11. The apparatus according to claim 9, including:

an engine speed sensor connected to said electronic controller, said engine speed sensor producing an engine speed signal;

a coolant temperature sensor connected to said electronic controller, said coolant temperature sensor producing a coolant temperature signal;

timing means connected to said electronic controller, said timing means producing an elapsed time signal;

wherein said electronic controller outputs a desired fuel command signal, inputs a boost pressure signal when said engine speed signal exceeds a predetermined engine speed value, said coolant temperature signal exceeds a predetermined coolant temperature value, said desired fuel command signal exceeds a predetermined fuel command value, and said timing has produced an elapsed time signal.

12. The apparatus according to claim 11, wherein said timing means produces said elapsed time signal periodically at predetermined intervals.

13. The apparatus according to claim 12 wherein the predetermined interval exceeds approximately thirty minutes.

14. The apparatus according to claim 11 wherein the predetermined engine speed value is about 1600 RPM.

15. The apparatus according to claim 11, wherein the predetermined fuel command value is about 95% of a full fuel command.

16. The apparatus according to claim 11, wherein the predetermined temperature value is about 85 degrees centigrade.

17. The apparatus according to claim 11, wherein said timing means produces said elapsed time signal periodically at predetermined intervals, wherein the predetermined interval exceeds approximately thirty minutes, wherein the predetermined engine speed value is about 1600 RPM, wherein the predetermined fuel command value is about 95% of a full fuel command, and wherein the predetermined temperature value is about 85 degrees centigrade.

* * * * *

UNITED STATES PATENT AND TRADEMARK OFFICE
CERTIFICATE OF CORRECTION

PATENT NO. : 5,447,031

DATED : September 5, 1995

INVENTOR(S) : Edward H. Betts & Shawn J. Weck

It is certified that error appears in the above-identified patent and that said Letters Patent is hereby corrected as shown below:

In claim 6, column 9, line 48, after the word "speed" insert the word "value".

In claim 7, column 9, line 51, the word "value" should be inserted after the word "speed".

Signed and Sealed this

Eleventh Day of June, 1996

BRUCE LEHMAN

Attest:

Attesting Officer     Commissioner of Patents and Trademarks